(12) United States Patent
Egnor et al.

(10) Patent No.: US 8,521,717 B2
(45) Date of Patent: Aug. 27, 2013

(54) PROPAGATING INFORMATION AMONG WEB PAGES

(75) Inventors: Daniel Egnor, Palo Alto, CA (US); Paul Haahr, San Francisco, CA (US); Kevin Lackner, San Francisco, CA (US); John Lamping, Los Altos, CA (US); Amitabh K. Singhal, Palo Alto, CA (US); Ke Yang, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/092,100

(22) Filed: Apr. 21, 2011

(65) Prior Publication Data

US 2011/0196861 A1    Aug. 11, 2011

Related U.S. Application Data

(63) Continuation of application No. 11/396,301, filed on Mar. 31, 2006, now Pat. No. 7,933,890.

(51) Int. Cl.
*G06F 7/00* (2006.01)
*G06F 17/30* (2006.01)

(52) U.S. Cl.
USPC ........................................................ 707/709

(58) Field of Classification Search
USPC .................................. 707/709, 999.005, 741
See application file for complete search history.

(56) References Cited

U.S. PATENT DOCUMENTS

| | | | |
|---|---|---|---|
| 4,021,780 A * | 5/1977 | Narey et al. ................... 235/54 F |
| 5,715,208 A * | 2/1998 | Casper et al. ............ 365/230.08 |
| 5,991,758 A | 11/1999 | Ellard |
| 6,256,440 B1 | 7/2001 | Kato et al. |
| 6,321,228 B1 | 11/2001 | Crandall et al. |
| 6,336,105 B1 * | 1/2002 | Conklin et al. ................. 705/80 |
| 6,434,548 B1 * | 8/2002 | Emens et al. ................. 707/709 |
| 6,526,440 B1 | 2/2003 | Bharat |
| 6,553,364 B1 | 4/2003 | Wu |
| 6,636,848 B1 * | 10/2003 | Aridor et al. .................. 707/728 |
| 6,651,058 B1 * | 11/2003 | Sundaresan et al. .................. 1/1 |
| 6,691,105 B1 | 2/2004 | Virdy |
| 7,047,229 B2 * | 5/2006 | Goel ..................................... 1/1 |
| 7,047,482 B1 * | 5/2006 | Odom ........................... 715/205 |
| 7,076,483 B2 * | 7/2006 | Preda et al. ........................... 1/1 |

(Continued)

FOREIGN PATENT DOCUMENTS

| KR | 0455439 | 11/2004 |
|---|---|---|
| WO | WO 2005/033978 | 4/2005 |

OTHER PUBLICATIONS

Examiner's First Report for Application No. 2007243784, dated Feb. 4, 2010, 2 pages.

(Continued)

*Primary Examiner* — Robert Beausoliel, Jr.
*Assistant Examiner* — Nicholas Allen
(74) *Attorney, Agent, or Firm* — Fish & Richardson P.C.

(57) ABSTRACT

Web pages of a Website may be processed to improve search results. For example, information likely to pertain to more than just the Web page it is directly associated with may be identified. One or more other, related, Web pages that such information is likely to pertain to is also identified. The identified information is associated with the identified other Web page(s) and this association is saved in a way to affect a search result score of the Web page(s).

44 Claims, 11 Drawing Sheets

(56) References Cited

U.S. PATENT DOCUMENTS

| | | | |
|---|---|---|---|
| 7,080,073 B1* | 7/2006 | Jiang et al. | 1/1 |
| 7,096,179 B2* | 8/2006 | Zhu et al. | 704/1 |
| 7,231,405 B2* | 6/2007 | Xia | 1/1 |
| 7,275,061 B1* | 9/2007 | Kon et al. | 1/1 |
| 2002/0013856 A1 | 1/2002 | Garcia-Luna-Aceves | |
| 2002/0054081 A1* | 5/2002 | Mimoun | 345/738 |
| 2002/0078044 A1* | 6/2002 | Song et al. | 707/6 |
| 2002/0099697 A1 | 7/2002 | Jensen-Grey | |
| 2002/0099700 A1* | 7/2002 | Li | 707/5 |
| 2002/0103797 A1 | 8/2002 | Goel et al. | |
| 2002/0174132 A1 | 11/2002 | Silverman | |
| 2003/0023582 A1 | 1/2003 | Bates et al. | |
| 2003/0043192 A1* | 3/2003 | Bouleau | 345/762 |
| 2003/0046275 A1 | 3/2003 | Osias | |
| 2003/0115171 A1* | 6/2003 | Mangalvedhekar | 707/1 |
| 2003/0115189 A1* | 6/2003 | Srinivasa et al. | 707/3 |
| 2003/0195877 A1* | 10/2003 | Ford et al. | 707/3 |
| 2003/0208578 A1 | 11/2003 | Taraborelli et al. | |
| 2004/0019588 A1 | 1/2004 | Doganata et al. | |
| 2004/0078757 A1* | 4/2004 | Golovchinsky et al. | 715/512 |
| 2004/0093323 A1* | 5/2004 | Bluhm et al. | 707/3 |
| 2004/0098362 A1* | 5/2004 | Gargi | 707/1 |
| 2004/0107365 A1* | 6/2004 | Hogg | 713/201 |
| 2004/0133564 A1 | 7/2004 | Gross et al. | |
| 2004/0205046 A1* | 10/2004 | Cohen et al. | 707/3 |
| 2004/0205076 A1 | 10/2004 | Huang et al. | |
| 2004/0205242 A1* | 10/2004 | Xu et al. | 709/245 |
| 2004/0205516 A1* | 10/2004 | Tufts | 715/501.1 |
| 2004/0243569 A1* | 12/2004 | Burrows | 707/3 |
| 2004/0243581 A1 | 12/2004 | Weissman et al. | |
| 2004/0267815 A1* | 12/2004 | De Mes | 707/104.1 |
| 2005/0015466 A1* | 1/2005 | Tripp | 709/219 |
| 2005/0027685 A1* | 2/2005 | Kamvar et al. | 707/2 |
| 2005/0108325 A1* | 5/2005 | Ponte | 709/203 |
| 2005/0120006 A1 | 6/2005 | Nye | |
| 2005/0216533 A1* | 9/2005 | Berkhin | 707/204 |
| 2005/0234952 A1* | 10/2005 | Zeng et al. | 707/101 |
| 2005/0278288 A1 | 12/2005 | Plow et al. | |
| 2006/0095430 A1 | 5/2006 | Zeng et al. | |
| 2006/0136378 A1* | 6/2006 | Martin | 707/3 |
| 2006/0149800 A1 | 7/2006 | Egnor et al. | |
| 2006/0230039 A1 | 10/2006 | Shull et al. | |
| 2006/0242147 A1* | 10/2006 | Gehrking et al. | 707/7 |
| 2006/0253437 A1 | 11/2006 | Fain et al. | |
| 2006/0294071 A1 | 12/2006 | Weare et al. | |
| 2007/0038603 A1 | 2/2007 | Guha | |
| 2007/0094234 A1 | 4/2007 | Wen et al. | |
| 2007/0112758 A1* | 5/2007 | Livaditis | 707/5 |
| 2007/0112777 A1* | 5/2007 | Field et al. | 707/10 |
| 2007/0112815 A1* | 5/2007 | Liu et al. | 707/101 |
| 2007/0130125 A1 | 6/2007 | Holte | |
| 2007/0180470 A1* | 8/2007 | Gill et al. | 725/52 |
| 2007/0203940 A1* | 8/2007 | Wang et al. | 707/103 R |
| 2007/0208684 A1* | 9/2007 | Isozaki et al. | 707/1 |
| 2007/0233808 A1* | 10/2007 | Egnor et al. | 709/217 |

OTHER PUBLICATIONS

PCT/ISA/220, "Notification of Transmittal of the International Search Report and the Written Opinion of the International Searching Authority, or the Declaration" for PCT/US07/06870, mailed Jul. 17, 2008, 1 page.

PCT/ISA/210, "International Search Report" for PCT/US07/06870, mailed Jul. 17, 2008, 3 pages.

PCT/ISA/237, "Written Opinion of the International Searching Authority" for PCT/US07/06870, mailed Jul. 17, 2008, 10 pages.

Summary of Korean Patent Office Action for corresponding Korean Patent Application No. 10-2008-7026761, 2 pages.

International Preliminary Report on Patentability from related Canadian Application No. 2,647,864 dated Aug. 9, 2011, 4 pages.

Kazama et al., "A Searching and Ranking Scheme using Hyperlinks and Anchor Texts," IPSJ SIG Notes, vol. 2000, No. 71 (Jul. 28, 2000), Information Processing Society of Japan, 9 pages (including abstract).

Official Action (translated) from related Japanese Patent Application No. 2009-502850 mailed Jul. 19, 2011, 3 pages.

Preliminary Rejection from related Korean Patent Application No. 10-2008-7026761 mailed Jul. 5, 2011, 5 pages.

Attardi et al., "Automatic Web Page Categorization by Link and Context Analysis," [online] [retrieved on Oct. 8, 2001] Retrieved from the Internet: URL:http://citeseer.nj.nec.com/cache/papers2/cs/7952/http:zSzzSzfaure.iei.pi.cnr.itzSzfabriziozSzPublicationszSzTHAI99zSzTHAI99, 16 pages.

Extended European Search Report dated Apr. 20, 2012 from related European Patent Application No. 07773258.4, 10 pages.

Communication dated May 8, 2012 from related European Patent Application No. 07773258.4, 1 page.

Brin et al., "The Anatomy of a Large-Scale Hypertextual Web Search Engine," Seventh International World-Wide Web Conference (WWW 1998), Apr. 14-18, 1998, Brisbane, Australia, 20 pages.

McBryan et al., "GENVL and WWW: Tools for Taming the Web," Proceedings of the First International World Wide Web Conference, ed. O. Nierstrasz, Geneva, May 1994, 12 pages.

* cited by examiner

PROPAGATING INFORMATION AMONG WEB PAGES

CROSS REFERENCE TO RELATED APPLICATION

This application is a continuation application of, and claims priority to, pending U.S. patent application Ser. No. 11/396,301, filed on Mar. 31, 2006, entitled "Propagating Useful Information Among Related Web Pages, such as Web Pages of a Website". The disclosure of the foregoing application is incorporated herein by reference in its entirety.

§1. BACKGROUND

§1.1 Field of the Invention

Embodiments consistent with the present invention concern information retrieval (IR). In particular, embodiments consistent with the present invention concern improving IR of documents, such as Web pages for example, that belong to one of a plurality of sets of documents, such as Websites for example.

§1.2 Background Information

Search engines have been very useful in helping people find information of interest on the World Wide Web ("the Web"), as well as on other networks. An exemplary search engine is described in the article S. Brin and L. Page, "The Anatomy of a Large-Scale Hypertextual Search Engine," Seventh International World Wide Web Conference, Brisbane, Australia and in U.S. Pat. No. 6,285,999 (both incorporated herein by reference). A search engine may receive queries for search results. In response, the search engine may retrieve relevant search results (e.g., from an index of Web pages). Such search results may include, for example, lists of Web page titles, snippets of text extracted from those Web pages, and hypetext links to those Web pages, and may be grouped into predetermined number of (e.g., ten) search results.

FIG. 1 is a high-level block diagram of an environment 100 that may include a network (such as the Internet for example) 160 in which an information access facility (client device) 110 is used to render information accessed from one or more content providers (e.g., Web page servers) 180. A search facility (server) 130 may be used by the information access facility 110 to search for content of interest.

The information access facility 110 may include browsing operations 112 which may include navigation operations 114 and user interface operations 116. The browsing operations 112 may access the network 160 via input/output interface operations 118. For example, in the context of a personal computer, the browsing operations 112 may be performed by a browser (such as Firefox from Mozilla, Netscape from AOL Time Warner, Opera from Opera Software, Explorer from Microsoft, etc.) and the input/output interface operations may be performed by a modem or network interface card (or NIC) and networking software. Other examples of possible information access facilities 110 include untethered devices, such as personal digital assistants ("PDAs") and mobile telephones for example, set-top boxes, kiosks, media players, etc.

Each of the content providers 180 may include stored resources (also referred to as content) 136, resource retrieval operations 184 that access and provide content in response to a request, and input/output interface operations 182. These operations of the content providers 180 may be effected by computers, such as personal computers or servers for example. Accordingly, the stored resources 186 may be embodied as data stored on some type of storage medium such as a magnetic disk(s), an optical disk(s), etc. In this particular environment 100, the term "document" may be interpreted to include addressable content, such as a Web page for example.

The search facility 130 may perform crawling, indexing/sorting, and query processing functions. These functions may be performed by the same entity or separate entities. Further, these functions may be performed at the same location or at different locations. In any event, at a crawling facility 150, crawling operations 152 get content from various sources accessible via the network 160, and store such content, or a form of such content, as indicated by 154. Then, at an automated indexing/sorting facility 140, automated indexing/sorting operations 142 may access the stored content 154 and may generate a content index (e.g., an inverted index, to be described below) and content ratings (e.g., PageRanks, to be described below) 140. Finally, query processing operations 134 accept queries and return query results based on the content index (and the content ratings) 140. The crawling, indexing/sorting and query processing functions may be performed by one or more computers.

FIG. 2 is a process bubble diagram of an advanced search facility 200. The advanced search facility 200 illustrated in FIG. 2 performs three main functions: (i) crawling; (ii) indexing/sorting; and (iii) searching. The horizontal dashed lines divide FIG. 2 into three parts corresponding to these three main functions. More specifically, the first part 150' corresponds to the crawling function, the second part 140' corresponds to the indexing/sorting function, and the third part 134' corresponds to the search (or query processing) function. (Note that an apostrophe "'" following a reference number is used to indicate that the referenced item is merely one example of the item referenced by the number without an apostrophe.) Each of these parts is introduced in more detail below. Before doing so, however, a few distinguishing features of this advanced search facility 200 are introduced. The advanced search facility uses the link structure of the Web, as well as other techniques, to improve search results.

Still referring to FIG. 2, the three main parts of the advanced search engine 200 are now described further. The crawling part 150' may be distributed across a number of machines. A single URLserver (not shown) serves lists of uniform resource locations ("URLs") 206 to a number of crawlers. Based on this list of URLs 206, the crawling operations 202 crawl the network 160' and get Web pages 208. Pre-indexing operations 210 may then generate page rankings 212, as well as a repository 214 from these Web pages 208. The page rankings 212 may include a number of URL fingerprint (i.e., a unique value), Page rank value as pairs. The repository 214 may include URL, content type and compressed page triples.

Regarding the indexing/sorting part 140', the indexing/sorting operations 220 may generate an inverted index 226. The indexing/sorting operations 220 may also generate page ranks 228 from the citation rankings 212. The page ranks 228 may include document ID, PageRank value pairs.

Regarding the query processing part 134', the searching operations 230 may be run by a Web server and may use a lexicon 232, together with the inverted index 226 and the PageRanks 228, to generate query results in response to a query. The query results may be based on a combination of (i) information derived from PageRanks 228 and (ii) information derived from how closely a particular document matches the terms contained in the query (also referred to as the information retrieval (or "IR") component).

As useful as such search engines, such as the one just introduced, have been, there is room for improvement. Consider, for example, the following two (2) scenarios.

First, consider the search query "Ramada Cincinnati". The present inventors believe that the most authoritative and useful search result would be for the Web page on the Ramada Website that describes its hotel in downtown Cincinnati. Consequently, it would be desirable to return (information about, and a link to) that Web page as the first search result. Unfortunately, while there is a lot of evidence indicating that the main Web page of the Ramada Website is authoritative for the word "Ramada", there might be little evidence that the Web page for its particular hotel in downtown Cincinnati is authoritative for the word "Ramada". Consequently, at least some search engines processing the search "Ramada Cincinnati" would return the main Web page of the Ramada Website as the first search result, even though it might not be as useful as the Web page on the Ramada Website for its hotel in downtown Cincinnati. Worse, at least some search engines might not return any Web page on the Ramada Website as one of its top search results.

Second, consider the search query "three seasons palo alto". In this example, the main Web page of the Website for the "Three Seasons" restaurant does not include the address of the restaurant. Thus, although there is a lot of evidence that the main Web page for the Website of the restaurant is authoritative for Three Seasons, there is no evidence on this main Web page that suggests it pertains to Palo Alto. Note that other Web pages on the Website do indicate that the restaurant is in Palo Alto.

As the foregoing examples illustrate, an automated search engine that uses just the information directly about a Web page (e.g., the words on the Web page and their structure, the words in anchors pointing to the Web page, and the Page-rank of the Web page) might not be able to find the Web page that would be the most useful for a particular query. Thus, it would be useful to improve search engines so that they return better search results. In particular, it would be useful to improve search engines (e.g., by improving the information that they process) so that while a search engine ranks the relevance of a term (e.g., words and/or phrases) of a query to one Web page, it may take account of the pertinence of the term to other Web pages on the same Web site. More generally, it would be useful to improve applications that use the same or similar IR techniques.

§2. SUMMARY OF THE INVENTION

Embodiments consistent with the present invention may be used to improve information retrieval, such as Web page search for example. Such embodiments may do so by (a) accepting information pertaining to a Website; (b) identifying a term, pertaining to a first Web page of the Website, that likely should pertain to another Web page of the Website for purposes of processing a search query including the term; (c) determining a second Web page of the Website that has a particular relationship with the first Web page; (d) determining whether or not the identified term should be associated with the second Web page; and (e) if it is determined that the term should be associated with the second Web page, then saving the association of the identified term with the second Web page such that the second Web page would have a higher search score for a search query including the identified term than it would otherwise have. At least some embodiments consistent with the present invention can use the foregoing technique to propagate information up, down, or across the topology of a Website.

In at least some embodiments consistent with the present invention, the act of identifying a term identifies a term strongly associated with the Website.

In at least some embodiments consistent with the present invention, the identified term is highly descriptive information such as, for example, a location, an address, an uncommon term, a product category, etc.

At least some embodiments consistent with the present invention may then (a) receive a search query including the identified term; and (b) increase the search result scores of the second Web page having a saved association with the identified search term. In at least some embodiments consistent with the present invention, a magnitude of the search result score increase is a function of a non-increased search result score of the second Web page.

§3. BRIEF DESCRIPTION OF THE DRAWINGS

§4. DETAILED DESCRIPTION

Figure 1:
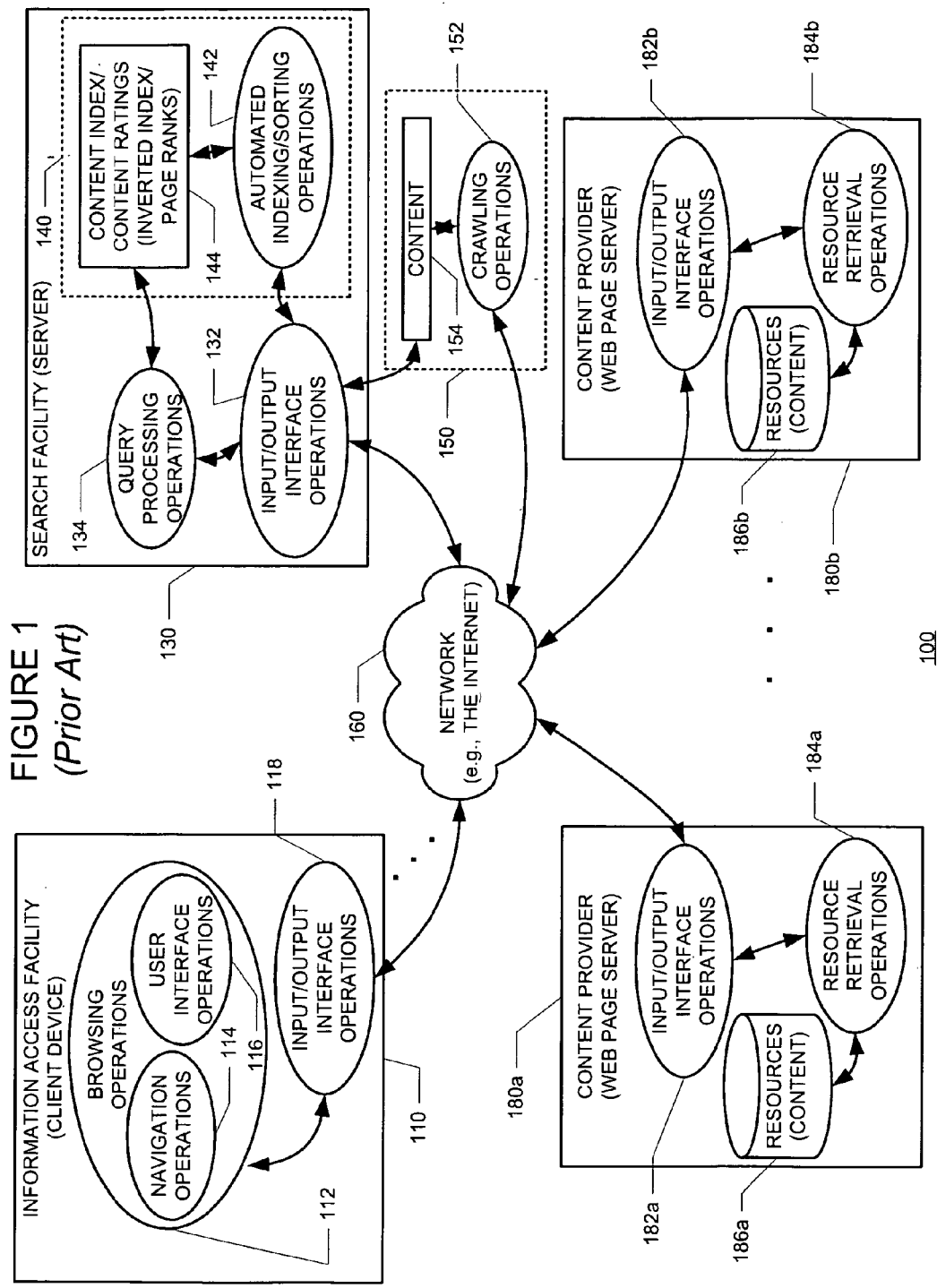
FIG. 1 is a bubble diagram of an exemplary environment in which, or with which, embodiments consistent with the present invention may be used.

The present invention may involve novel methods, apparatus, message formats, and/or data structures for improving information retrieval, such as Web page search for example. The following description is presented to enable one skilled in the art to make and use the invention, and is provided in the context of particular applications and their requirements. Thus, the following description of embodiments consistent with the present invention provides illustration and description, but is not intended to be exhaustive or to limit the present invention to the precise form disclosed. Various modifications to the disclosed embodiments will be apparent to those skilled in the art, and the general principles set forth below may be applied to other embodiments and applications. For example, although a series of acts may be described with reference to a flow diagram, the order of acts may differ in other implementations when the performance of one act is not dependent on the completion of another act. Further, non-dependent acts may be performed in parallel. Also, as used herein, the article "a" is intended to include one or more items. Where only one item is intended, the term "one" or similar language is used. In the following, "information" may refer to the actual information, or a pointer to, identifier of, or location of such information. No element, act or instruction used in the description should be construed as critical or essential to the present invention unless explicitly described as such. Thus, the present invention is not intended to be limited to the embodiments shown and the inventors regard their invention to include any patentable subject matter described.

A "document" is to be broadly interpreted to include any machine-readable and machine-storable work product. A document may be a file, a combination of files, one or more files with embedded links to other files, a demarcated and identified part of a file, etc. The files may be of any type, such as text, audio, image, video, etc. Parts of a document to be rendered to an end user can be thought of as "content" of the document. A document may include "structured data" containing both content (words, pictures, etc.) and some indication of the meaning of that content (for example, e-mail fields and associated data, HTML tags and associated data, etc.) Ad spots in the document may be defined by embedded information or instructions. In the context of the Internet, a common document is a Web page. Web pages often include content and may include embedded information (such as meta information, hyperlinks, etc.) and/or embedded instructions (such as JavaScript, etc.). In many cases, a document has an addressable storage location and can therefore be uniquely identified by this addressable location. A universal resource locator (URL) is an address used to access information on the Internet.

A "Web document" includes any document published on the Web. Examples of Web documents include, for example, a Website or a Web page.

A "home" Web page will typically be the root Web page of a Website, or a Web page with a URL suggesting that it is a home page (such as "default.HTML").

A "term" may be a "word" or a "phrase".

In the following, environments in which, or with which, the present invention may operate are described in §4.1. Exemplary embodiments of the present invention are described in §4.2. Thereafter, specific examples illustrating uses of exemplary embodiments of the present invention are provided in §4.3. Finally, some conclusions regarding the present invention are set forth in §4.4.

§4.1 Exemplary Environment in which, or with which, Embodiments Consistent with the Present Invention may be Used Embodiments consistent with the present invention may be used in, or with, an exemplary environment 100 such as described above with reference to FIG. 1. For example, such embodiments may be used in, or with, an exemplary search engine such as the one described above with reference to FIG. 2. Naturally, embodiments consistent with the present invention may be used in, or with, other environments.

§4.2 Exemplary Embodiments Consistent with the Present Invention

Figure 3:
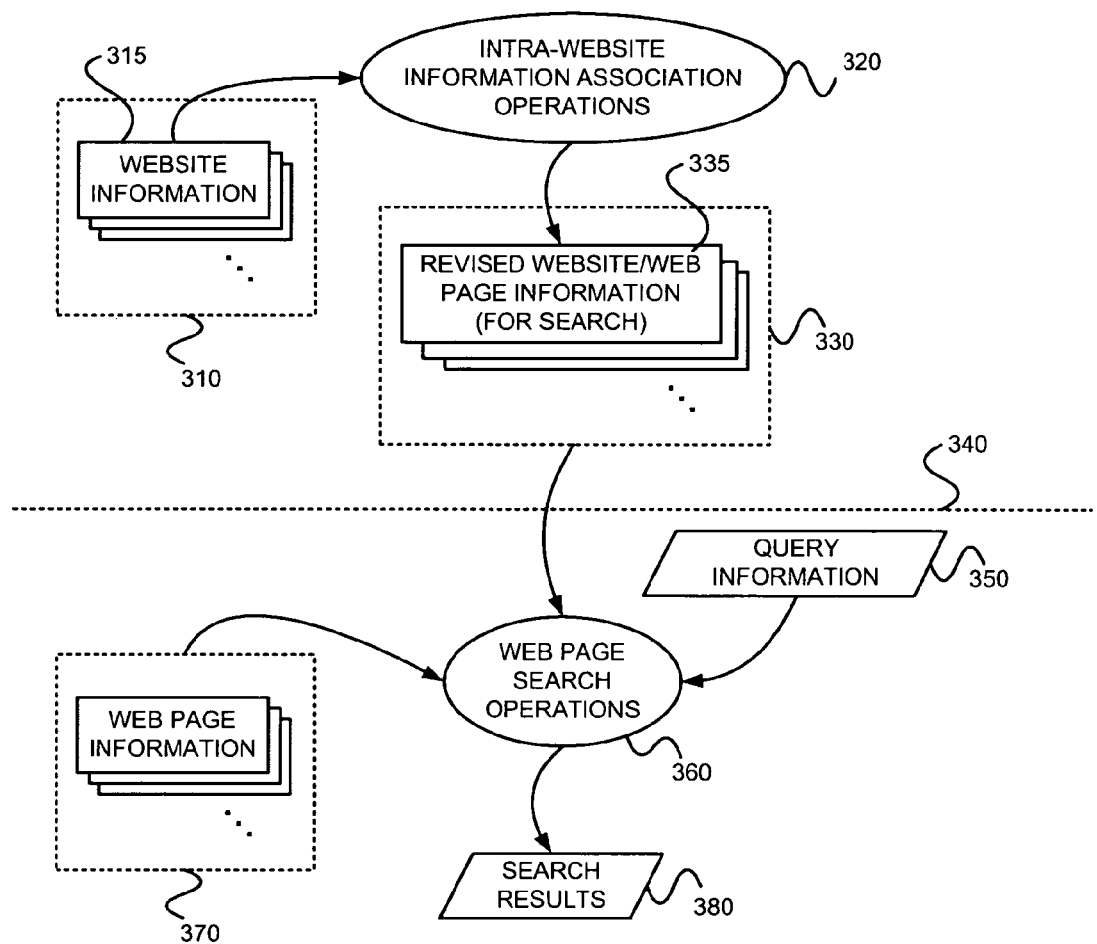
FIG. 3 is a bubble diagram of operations that may be performed, and information that may be generated and/or used by such operations, in embodiments consistent with the present invention.

FIG. 3 is a bubble diagram of operations that may be performed, and information that may be generated and/or used by such operations, in embodiments consistent with the present invention. Generally, operations above line 340 are performed ahead of time, whereas operations below the line 340 are performed in real-time. However, in at least some embodiments consistent with the present invention, this is not necessary.

Website collection information 310 may include a number of sets of Website information 315. Intra-website information association operations 320 may be used to generate revised Website and/or Web page information 335. Such information may be used for purposes of IR for example. Thus, information from a number of Websites 310 can be processed to generate a set of 330 of revised Website and/or Web page information 335.

Web page search operations 360 may use Web page information 370 and the set 330 of revised Website and/or Web page information to generate a set of one or more search results 380 responsive to query information 350.

Generally, the intra-Website information association operations 320 may (i) identify information likely to pertain to more than just the Web page it is directly associated with, (ii) identify one or more other, related, Web pages that such information is likely to pertain to, and (iii) associate the identified information with the identified other Web page(s) such that the Web page(s) would have a higher search score for a search query including the identified information than it would otherwise have. This results in revised Website and/or Web page information that may be used in retrieving and scoring Web pages. The search score may affect a ranking of a search result, and therefore may affect a position of the search result with respect to other search results and even whether or not the search result is returned in response to a query.

§4.2.1 Exemplary Methods

Figure 4:
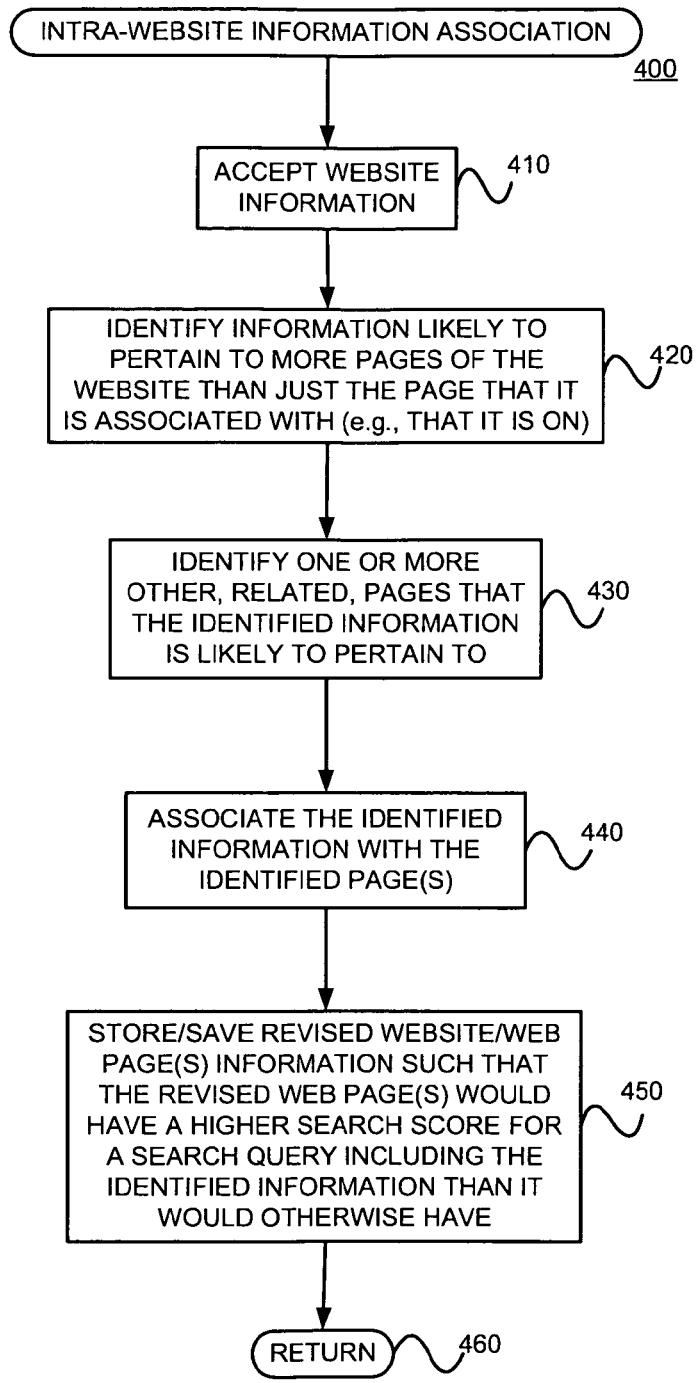
FIG. 4 is a flow diagram of an exemplary method for associating intra-Website information in a manner consistent with the present invention.

FIG. 4 is a flow diagram of an exemplary method 400 for associating intra-Website information in a manner consistent with the present invention. Website information (e.g., Web pages, Web page content, Web page meta data, yellow pages data, domain registration data, etc. is accepted. (Block 410) Information which is likely to pertain to Web pages of the Website other than just the Web page that it is (directly) associated with, is identified. (Block 420) One or more other, related Web pages that the identified information is likely to pertain to are identified. (Block 430). The identified information is then associated with the identified Web page(s). (Block 440) The revised Website and/or Web page(s) (e.g., the Web pages with the new associated information) information is stored (e.g., saved on storage device for later use) such that the revised Web page(s) would have a higher search score for a search query including the identified information than the original Web page(s) would have had (Block 450), before the method 400 is left (Node 460).

Referring back to block 420, examples of the information identified, or the types of information identified, are described below. Referring back to block 430, examples of how one or more related Web pages that the identified information is likely to pertain to are described below. As will be appreciated from the description below, such information might be propagated up, down, and/or across the Website in various embodiments.

Figure 5:
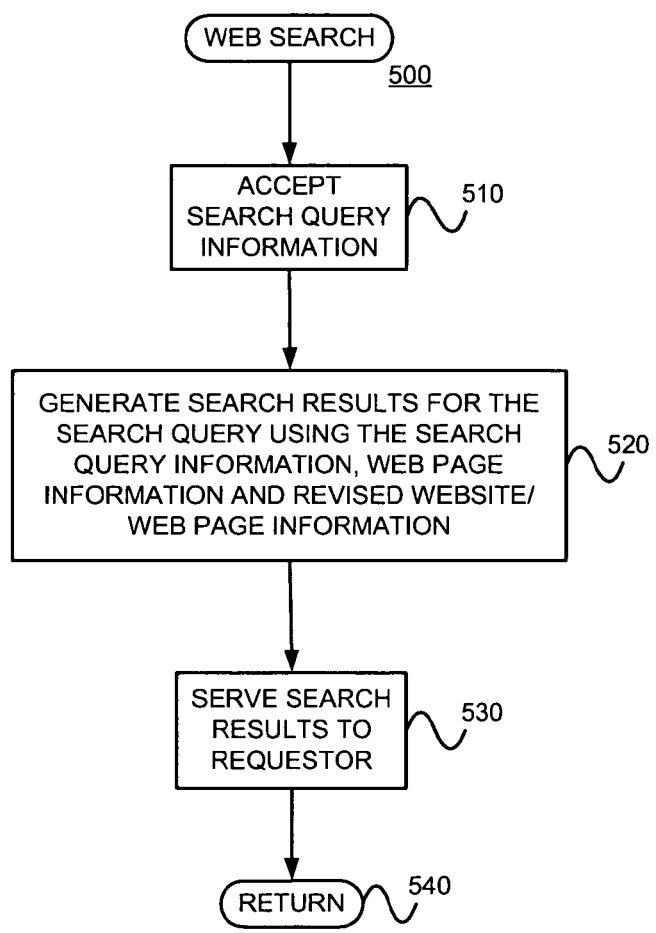
FIG. 5 is a flow diagram of an exemplary method for performing a Web search in a manner consistent with the present invention.

FIG. 5 is a flow diagram of an exemplary method 500 for performing a Web search in a manner consistent with the present invention. Search query information is accepted. (Block 510) A set of one or more search results are then generated using the accepted search query information, Web page information and revised Website and/or Web page information. (Block 520) The search result(s) are then served to the requestor (Block 530) before the method 500 is left (Node 540).

Figure 6:
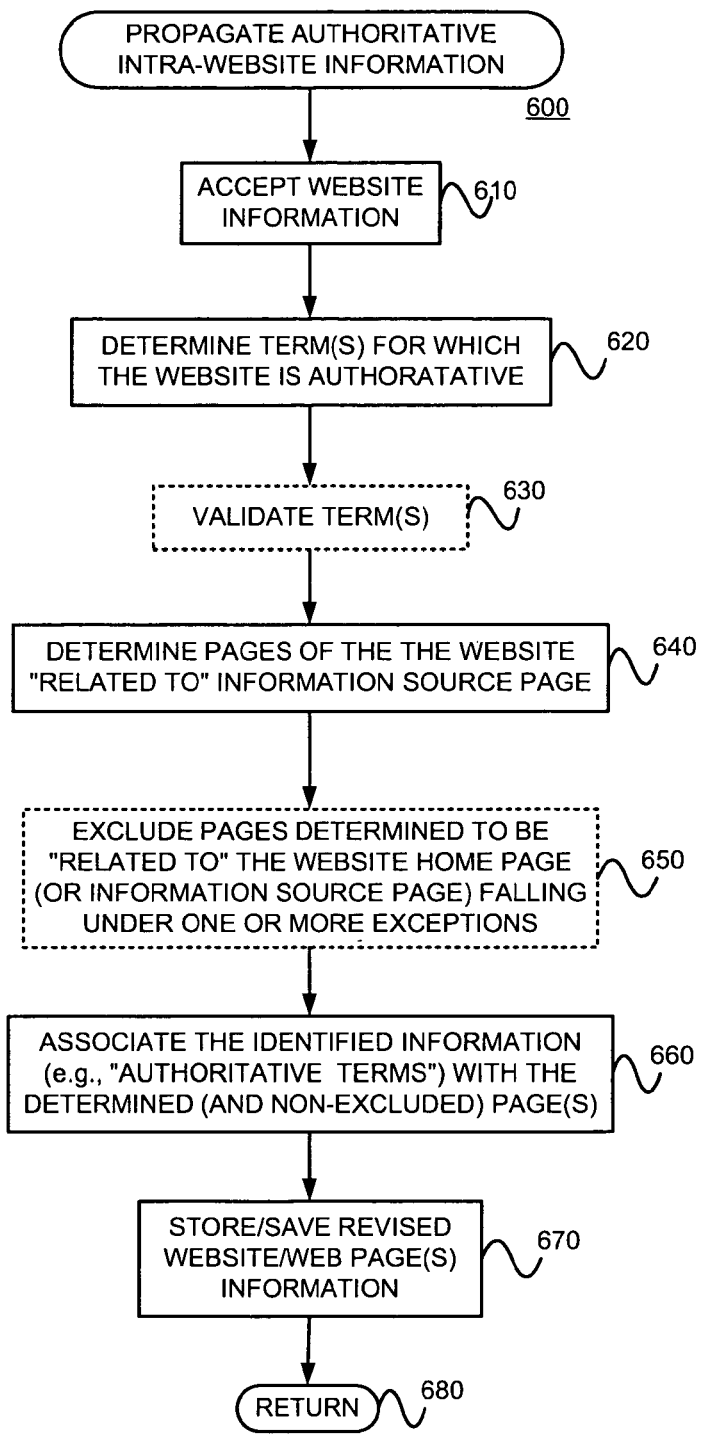
FIG. 6 is a flow diagram of an exemplary method for propagating authoritative intra-Website information (e.g., down a Website topology) in a manner consistent with the present invention.

§4.2.1.1 Exemplary Methods for Propagating Term Information for which the Website is Deemed Authoritative FIG. 6 is a flow diagram of an exemplary method 600 for propagating authoritative intra-Website information (e.g., down a Website topology) in a manner consistent with the present invention. Website information is accepted. (Block 610) For a given Web page of the Website (e.g., the home page), term(s) found on the given Web page for which the Website is deemed authoritative, are determined. (Block 620) Such term(s) (e.g., words and/or phrases) may be subject to a validation procedure. (Block 630) Web pages of the Website related to the information source Web page (e.g., Website home page or root page) are determined. (Block 640) Web pages determined to be related falling under one or more exceptions may be excluded. (Block 650) The identified information (e.g., authoritative terms) may then be associated with the determined (and non-excluded) Web pages. (Block 660) The revised Website and/or Web page information may then be saved (e.g., stored) (Block 670) before the method 600 is left (Node 680).

Referring back to block 620, one or more sources of evidence may be considered when determining a term for which the Website is deemed authoritative. One exemplary source of evidence that a Website is authoritative for a term(s) may be the use of the term(s) in one or more references (e.g., links or hypertext links) to the Website. Yet another exemplary source of evidence that a Website is authoritative for a term(s) may be the use of the term(s) (e.g., a business name) in a directory (e.g., Yellow Page) entry that lists the home page of the Website as the Website for the business. Still another exemplary source of evidence that a Website is authoritative for a term(s) may be the use of the term(s) in the domain name of the Website. Still yet another exemplary source of evidence that a Website is authoritative for a term(s) may be if the term(s) is a registered trademark, and the trademark registration is associated with (the home page of) the Website. Another exemplary source of evidence may be a probability that if a search query includes a term, then there will be a good search result (e.g., one that is clicked on, one that receives a "long click" where the user doesn't return back to the previous Web page and click on a different result for a given amount of time (e.g., three minutes), etc.) corresponding to the Website. The probability might correspond to the strength of the evidence.

Naturally, other sources of evidence that a Website is authoritative for a term(s) are possible. The totality of the evidence may lead to the determination that the Website is authoritative for the term. Contra-evidence may also be considered. For example, if there is evidence that the term is relevant to other Web pages of one or more other Websites, such evidence may be considered in the totality of evidence. In at least some embodiments, the strength of the evidence may be used in determining strength of the association (as used for IR purposes) of the determined term and the destination (or sink) Web page. That is, the strength of the evidence may be used to determine (a) whether or not to make and association, and/or (b) a strength of the association.

Referring back to block 640, in at least some embodiments consistent with the present invention, the degree of relatedness between the Web page source of the determined term and the destination (or sink) Web page may be used in determining a strength of the association (as used for IR purposes) of the determined term and the destination (or sink) Web page.

Referring back to block 630, the determined term(s) might be subject to one or more validation tests. For example, for the determined term, the probability that if a search query includes the term, there will be a good result for the Website under consideration might have to be greater than (or more than a predetermined amount and/or percentage greater than) the corresponding probability for all other Websites (for which such information is known or determinable). As another example, if there are more than a predetermined number of determined terms, it might be desirable to use only the N top (e.g., in terms of probability, probability differential from next best Website, etc.) query terms.

Referring back to block 650, the determined query information ("the identified information") might not be propagated (e.g., down) to certain Web pages of the Website under consideration. For example, Web pages with a low score (e.g., a low page rank) might not get the identified information associated with them. As another example, the propagation of the identified information may be limited to a predetermined number (e.g., 2) of degrees of separation (e.g., number of backslashes from source Web page) of the source (e.g., home or root) Web page and the destination Web page in the Website. As yet another example, certain types of Web pages (e.g., press releases, message boards, forums, foreign language page (e.g., the destination page in a language other than that of the source page, etc.) might be excluded.

Note that if the term is a phrase, in at least some embodiments consistent with the present invention, the entire phrase (or at least all word of the phrase) might be required to occur in the query to avoid certain problems. Consider, for example, Websites like "american century investments". Although the home page of this Website might be authoritative for the query "american century investments", it is not authoritative for the component words "american", "century" and "investment" of the query. Thus, for example, Web pages of this Website should not get "boosts" for search queries that include the word "investments", but don't include "american century".

Note that propagating information down might, in effect, allow an otherwise identical Web page on different Websites to have different scores. For example, a Web page of the Cincinnati Ramada on the Website of www.ramada.com might have a higher score than the identical Web page on the Website of www.hotels.com (at least for search queries including the term "ramada"). This is useful because most users searching for the Ramada hotel in Cincinnati would likely prefer the Web page from the authoritative Website when the search query includes the term "ramada".

§4.2.1.2 Exemplary Methods for Propagating Highly Descriptive Information

The inventors of the present invention recognized that highly descriptive words (and other information) of a Website are often not found on the home page of the Website. It would be useful to identify such highly descriptive information and associated it with the home (or root) page of the Website.

Figure 7:
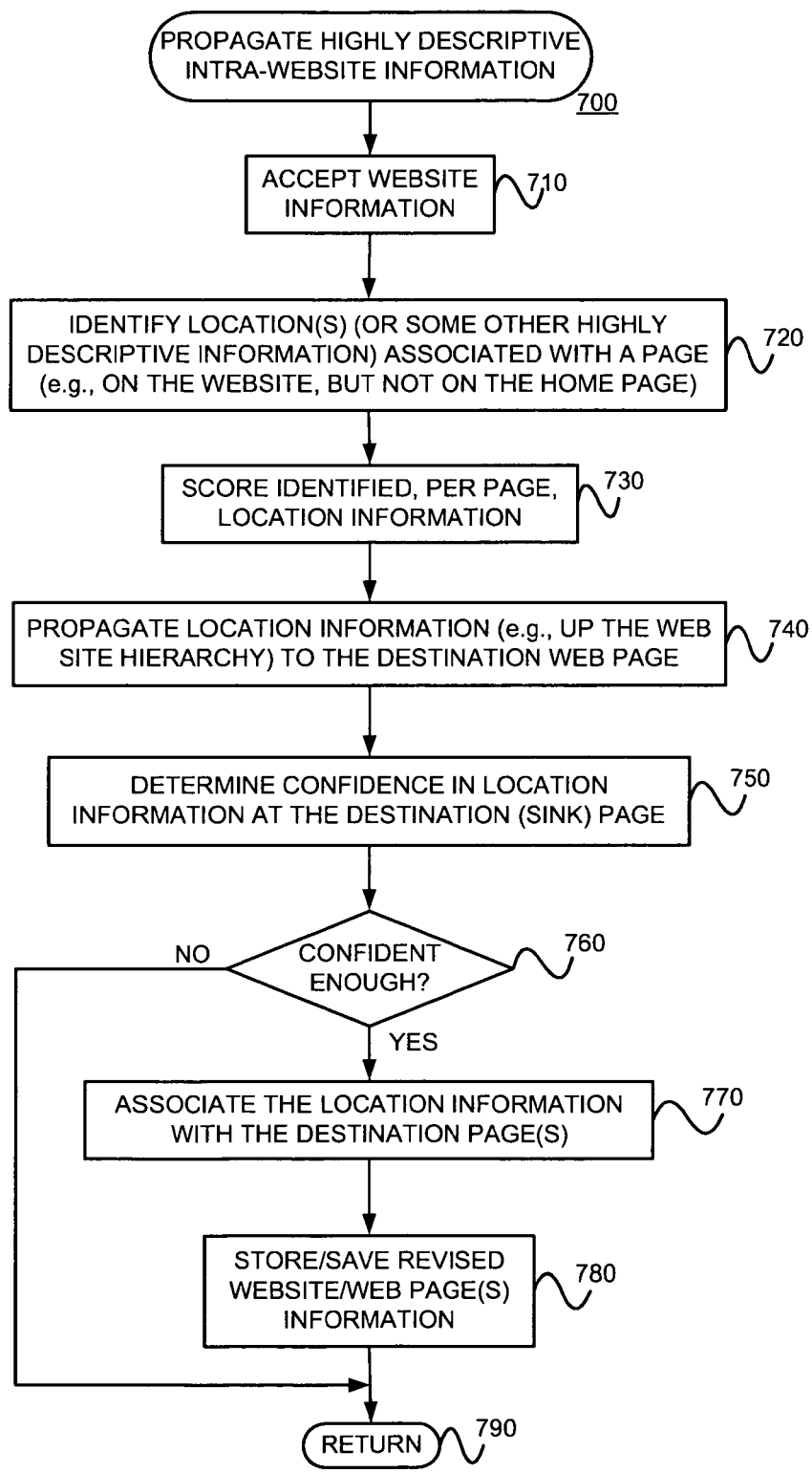
FIG. 7 is a flow diagram of an exemplary method for propagating highly descriptive intra-Website information (e.g., up a Website topology) in a manner consistent with the present invention.

FIG. 7 is a flow diagram of an exemplary method 700 for propagating highly descriptive intra-Website information (e.g., up a Website topology) in a manner consistent with the present invention. Website information is accepted. (Block 710) Location(s) (e.g., addresses) or some other highly descriptive information associated with a Web page other than the home (or root) page of the Website, is identified.

(Block 720) The identified information (e.g., location) is information might be scored per Web page. (Block 730) The identified information (e.g., location) is propagated (e.g., up the Web site topology) to one or more destination Web pages. (Block 740) A confidence in the pertinence of the identified information (e.g., location) to a destination Web page is determined. (Block 750) If the confidence is not high enough, the method 700 is simply left. (Block 760 and Node 790) On the other hand, if the confidence is high enough, the identified information (e.g., location) is associated with the destination Web page (Blocks 760 and 770), and this association is be stored (e.g., saved) (Block 780) before the method 700 is left (Node 790).

Note that blocks 760-780 may be run for each of the one or more destination Web pages. It is possible for the confidence to be high enough for one Web page of the Website, but not another. Thus, in at least some embodiments consistent with the present invention, the evidence for each Web page is evaluated separately (except as described below). At each Web page, all the evidence for all Web pages below it in the Website topology is accumulated. The information for the particular Web page is evaluated using these accumulated evidence. For example, a Web page lower in the site topology might have information for just one address, which is enough evidence to propagate the address. However, a Web page higher in the site topology might have evidence for other addresses as well, which may lead to a conclusion that no one address is particularly relevant for the Website, in which case the address(es) might not be propagated up to such Web page higher in the site topology. Alternatively, or in addition, a first Web page on a Website may have sufficient evidence to be confident enough, but a second Web page on the Website that is not above the first Web page on the site topology may have no evidence, insufficient evidence, and/or contra-evidence.

In at least some embodiments consistent with the present invention, after propagating information upward, the total number of different addresses for which any Web page has conclusive evidence might be associated with (e.g., recorded on) all Web pages of the Website. When scoring address information, if a Website has many addresses, the address information on any given page might be given less weight, because the Website, overall, does not seem to have any physical focus.

Referring back to block 720, locations associated with a Web page might be identified. Various sources of data that might be used to identify the locations, include full addresses on the Web page, occurrences of location names on the Web page, yellow page data (e.g., with home pages and/or telephone numbers) giving an address or location for the Web page, Meta information from domain registration, country code of domain, data bases including terms that are places, location names occurring on other pages near links to the page, etc. The location names from each source might be associated with the Web page. In addition, the kind and number of sources that provided each piece information might be tracked. Referring back to block 730, such information may be used to score the identified location information.

Still referring back to block 720, information instead of, or in addition to, location information may be identified. As one example, uncommon terms (e.g., high inverse document frequency (IDF) terms, etc.) may be propagated (e.g., up to the home (or root) page). As another example, page categories (e.g., from a predefined list, from vertical categories, from concepts, from topics, from genres, etc.) might be propagated (e.g., up to the home (or root) page).

Referring back to block 740, this information might be propagated up the URL hierarchy of the Website. For example, at each Web page, all locations mentioned at or below it in the URL hierarchy for the Website might be accumulated. The scores or one or more factors affecting the scores (e.g., source(s) of location, and frequency(ies) of the location(s), etc.) might be accumulated. Referring back to block 750, the accumulated scores or score factors may be used to determine a confidence value for each location. That is, all of the location information and their sources may be weighed to determine a confidence in each location. To reiterate, the confidence scoring might be done for each Web page, where the confidence score is a function of information only on Web page(s) below the particular Web page in the Website topology.

Referring back to block 760, which, if any, locations are believed to be confidently associated with the Web page are determined. A machine learning system might be used to decide how to weigh the different kinds of "location confidence" evidence. (See, e.g., U.S. patent application Ser. No. 10/706,991 (referred to as "the '991 application" and incorporated herein by reference), titled "RANKING DOCUMENTS BASED ON LARGE DATA SETS", filed on Nov. 13, 2003, and listing Jeremy Bern, Georges Harik, Noam Shazeer, Simon Tong and Joshua Levenberg as inventors; and U.S. patent application Ser. No. 10/734,584 (referred to as "the '584 application" and incorporated herein by reference), titled LARGE SCALE MACHINE LEARNING SYSTEMS AND METHODS, filed on Dec. 15, 2003 and listing Jeremy Bem, Georges Hank, Noam Shazeer, Simon Tong and Joshua Levenberg as inventors, which describe machine learning techniques that might be used. See also, T. Hastie, R. Tibshirani, and J. H. Friedman, *The Elements of Statistical Learning*, Springer (Jul. 30, 2003).) Examples of evidence might include the source of the evidence (e.g., address on Web page, yellow pages data, domain registry, data, etc.), the path (up the hierarchy, for example) of the evidence to the current Web page, capitalization, context, etc. The machine learning system might be trained using examples drawn from Web pages for which there exists reliable evidence (e.g., yellow pages data is typically very reliable). Once the system is trained, it can be used to weigh the information accumulated for each location name at each Web page. Still referring to block 760 rather than applying confidence to a threshold to see whether or not to associate the location information to a destination (sink) Web page, in at least some embodiments consistent with the present invention, the confidence level may be used in determining a strength of the association (as used for IR purposes) of the location and the destination (or sink) Web page. That is, the confidence level may be used to determine (a) whether or not to make an association, and/or (b) a strength of the association.

In at least some embodiments consistent with the present invention, if there are too many locations deemed relevant, it might be desired to not propagate any of these locations up (to the home page of) the Website. Thus, the number of distinct locations may be used in the weighting of evidence. For example, for a given Web page, if there is evidence of many different addresses, then it may be desirable to propagate none of the addresses to that Web page, or to propagate such addresses but give them less weight in later scoring when being considered as a relevant search result for a query including one or more of the addresses. Consider a nationwide franchise like McDonalds that has locations through out the United States. In such a scenario, it might be undesirable to propagate up all of those locations to the home page for McDonalds' Website. This is because a multitude of locations is not highly descriptive of McDonald's Website. Furthermore, although the foregoing concerns analysis of evidence or weighting of propagated location information on a per-Web page basis, it may be useful to apply certain Website-wide tests. For example a Website is deemed to include more than a predetermined number of (e.g., 20) different addresses, it may be desirable not to propagate any of the addresses to any of the Web pages of the Website.

If the conclusion of the model is that the Web page probably is associated with one or more locations, the locations are considered to be likely to pertain to the Web page. Referring back to blocks 770 and 780, the location(s) may then be associated with the Web page, and this association may be stored (e.g., saved).

In at least some embodiments consistent with the present invention, the location information might be propagated up only to the home (or root) page of the Website.

When processing a query, in at least some embodiments consistent with the present invention, the Web page might be given credit for having all the words of the location, provided there are other significant words in the query besides the location. That is, it might be desired to not give added location credit to the Web page if the query is only about an address. If on the other hand, there are other significant, non-location, words in the query, it might be desirable to give each location word as much as credit as (or no more credit than) there is for the strongest significant non-location word of the query. If there are many locations associated with a Website, it might be desired to reduce the amount of credit given.

Although some of the embodiments described above concerned propagating highly descriptive information up the topology of a Website, at least some embodiments consistent with the present invention might propagate such information down or across (e.g., first up, then down) the topology of the Web site.

§4.2.2 Exemplary Apparatus

Figure 11:
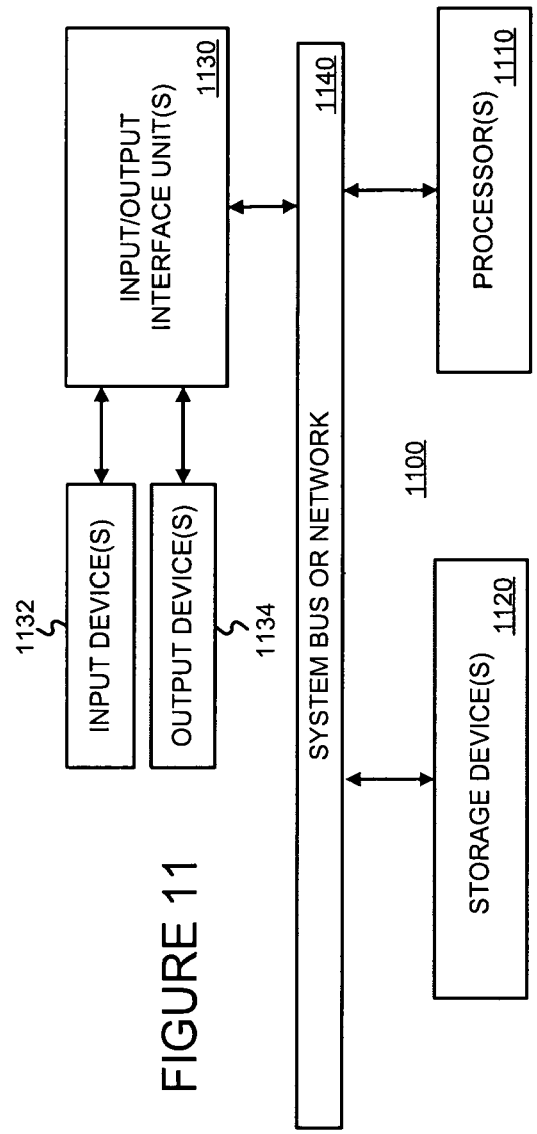
FIG. 11 is a block diagram of apparatus that may be used to perform at least some operations, and store at least some information, in a manner consistent with the present invention.

FIG. 11 is a block diagram of apparatus 1100 that may be used to perform at least some operations, and store at least some information, in a manner consistent with the present invention. The apparatus 1100 basically includes one or more processors 1110, one or more input/output interface units 1130, one or more storage devices 1120, and one or more system buses and/or networks 1140 for facilitating the communication of information among the coupled elements. One or more input devices 1132 and one or more output devices 1134 may be coupled with the one or more input/output interfaces 1130.

The one or more processors 1110 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to perform one or more aspects of the present invention. At least a portion of the machine executable instructions may be stored (temporarily or more permanently) on the one or more storage devices 1120 and/or may be received from an external source via one or more input interface units 1130.

In one embodiment, the machine 1100 may be one or more conventional personal computers. In this case, the processing units 1110 may be one or more microprocessors. The bus 1140 may include a system bus. The storage devices 1120 may include system memory, such as read only memory (ROM) and/or random access memory (RAM). The storage devices 1120 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1132, such as a keyboard and pointing device (e.g., a mouse) for example. Other input devices such as a microphone, a joystick, a game pad, a satellite dish, a scanner, or the like, may also (or alternatively) be included. These and other input devices are often connected to the processing unit(s) 1110 through an appropriate interface 1130 coupled to the system bus 1140. The output devices 1134 may include a monitor or other type of display device, which may also be connected to the system bus 1140 via an appropriate interface. In addition to (or instead of) the monitor, the personal computer may include other (peripheral) output devices (not shown), such as speakers and printers for example.

Figure 2:
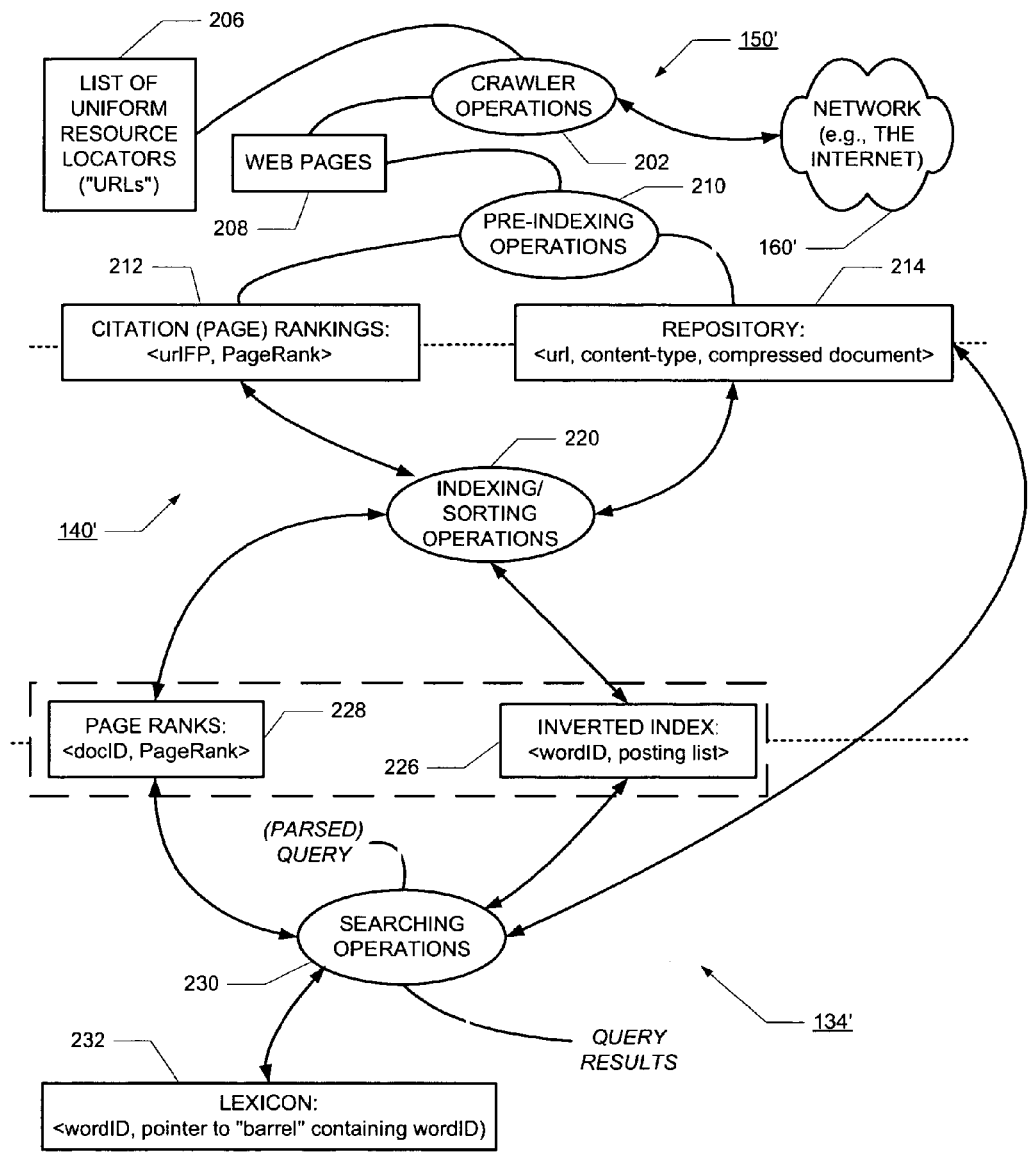
FIG. 2 is a bubble diagram of an exemplary search engine in which, or with which, embodiments consistent with the present invention may be used.

The operations described above may be performed on one or more computers. Such computers may communicate with each other via one or more networks, such as the Internet for example. Referring backs to FIGS. 1 and 2 for example, the client devices 110, search facilities 130, content providers 180, etc., may be embodied by one or more machines 1100.

§4.2.3 Refinements and Alternatives

At least some embodiments consistent with the present invention may use different techniques for determining whether a Website is "authoritative" for a term. For example, if the search term is a known (e.g., registered trademark), a Website of the trademark owner might be deemed "authoritative" for the trademark term. As discussed above, various sources of evidence may be considered and a totality of the evidence may be weighed.

Referring back to 440 and 450 of FIG. 4, 660 and 670 of FIG. 6 and 770 and 780 of FIG. 7, identified information may be associated with an identified Web page in various ways. For example, an inverted index, such as the one 226 illustrated in FIG. 2, may be modified to reflect the association of the identified information with the identified Web page. More specifically, a term (e.g., a word or a phrase) may point to various {Web page identifier, weight} pairs. The weight may be referred to as a hit count. Consider, for example, the word "Ramada" being mapped to a Web page (ID#=1234) for a Ramada hotel in Cincinnati. The inverted index might initially include the information:

Ramada→ . . . , {ID#1234,5}, . . .

Suppose further that since the home page of the Website for Ramada is authoritative for the keyword "Ramada" and that it is desired to propagate "Ramada" down to other Web pages of the Website. After the association and saving acts, the inverted index might now include the information:

Ramada→ . . . , {ID#1234,25}, . . .

The weight may therefore be increased.

Alternatively, a special type of weight boost may be applied such that it may be selectively used in certain situations, but not in others (e.g., depending on the search query). That is, it may be used to boost the weight in some situations, but not in others (e.g., depending on the search query). In such embodiments, a term (e.g., a word or a phrase) may point to various {Web page identifier, weight, weight boost} triples. Using a similar example as that above, the inverted index might initially include the information:

Ramada→ . . . , {ID#1234,5,nul}, . . .

After the association and saving acts, the inverted index might then include the information:

Ramada→ ..., {ID#1234,5,3}, ...

Although the weight boost is shown as a variable, it may be simply a binary value indicating whether or not to boost the weight. In some embodiments consistent with the present invention, even if the binary value indicates that the weight should be boosted, in certain circumstances (e.g., factors of the query), boosting the weight might be prevented or decreased.

In at least some embodiments consistent with the present invention, the "boost" may be applied to a Web page's score (e.g., an IR score, and/or a Page rank score, etc.) or a component of the score. The amount of the boost may be a function of the score, such that a Web page with a high score initially gets a bigger boost than a Web page with a lower initial score. For example, the boost may be applied as:

$$score' = score*(1+boost*score)$$

where the boost and score are greater than 1.

Although embodiments described above were in the context of user search queries, embodiment consistent with the present invention might be applied to other applications such as advertising lead generation, or local ad targeting for example.

In at least some embodiments consistent with the present invention, the query can be processed depending on whether it is desired to use the revised Web page information, or the original Web page information when processing the query. As one example, two filters may be applied to a query to decide what revised page information to use when the query includes geographic term information. Each of these filters is discussed below.

For the first filter, a list of terms that are likely to be geographical terms, based on whether they appear in queries in ways that geographical terms do, may be generated offline. For example, geographical terms often appear in queries like "hotels in X". If the fraction of all appearances of a potential geographical term that are in queries like is significantly lower than the corresponding fraction for most geographical terms, the term may be considered to be non-geographical. For example, although "MS" (the abbreviation for "Mississippi") is a geographical term, it can mean many other things, as in the phrase "MS California". As a rule, it may desirable to not treat "MS" as a geographical term unless is occurs in a phrase in the query, like "Jackson Miss." that does typically occur in geographical contexts. Thus, a list of geographical terms may be generated based on terms with a sufficiently high fraction of their occurrences in queries like "hotels in X", and similar query forms indicating geography. Then, when scoring a Web page for a query, only the revised geographical Web page information for terms that have been confirmed as geographical are used. Doing so avoids problems for queries like "MS California".

For the second filter, a list of terms that occur very frequently in queries, like "hotel", "pizza", etc. may be generated offline. Then, even if some terms of a query are identified as being geographical, the revised information still might not be used unless at least one other word of the query is not a frequent word. This avoids problems for queries like "London Hotels" where it would be desirable to provide search results corresponding to Web pages that are about London hotels in general, rather than just a few search results corresponding to individual hotels.

In at least some embodiments described above, information (e.g., a term) saved in association with a Web page of a Website (such that the Web page would have a higher search score for a search query including the term than it would otherwise have) came from another Web page of the same Website. However, in at least some embodiments consistent with the present invention, such information (e.g., a term) might come from a document not belonging to the Website. Assume, for example, that a first Web page of a first Website includes an address and a reference (e.g., a link), near the address, to a second Web page of a second Website. This might suggests that the address found on the first Web page of the first Website might pertain to the second Web page of the second Website. Thus, the address might be saved in association with second Web page such that the second Web page would have a higher search score for a search query including the address (or perhaps a portion of the address) than it would otherwise have.

Indeed, the source of the information need not be a Web page, and the relationship need not be a link. Consider, for example, an SEC filing, a business license filing, etc. including a business name and an address of the business (e.g., a corporation's principle place of business). If a Website is registered to the business, or has a URL including the business name, or prominently displays the business name, but no address information, at least some embodiments consistent with the present invention might take the address (the information) of the SEC filing, business listing, etc. (the first document), determine a Website of the named business (a second document related to the first document), and save the address in association with the home page of the Website such that it would have a higher search score for a search query including the address (or perhaps a portion of the address) than it would otherwise have. Note that this second example is slightly different from using other information sources to obtain evidence to validate that information is of a certain type.

As the foregoing examples illustrate, the source of the information need not be a Web page on the same Website, and need not even be a Web page.

In at least some embodiments consistent with the present invention, the information (e.g., terms) might have to belong to a class of information (e.g., addresses) that is likely to pertain to other documents. In other words, information need not be saved in association with Web pages indiscriminately. Rather, the information might be limited to certain classes or types of information. Examples of classes of information might include addresses, telephone numbers, type of business, genre of page, etc.

In at least some embodiments consistent with the present invention, the source of the information need not be a particular document at all. Rather, the source of the information might be a relationship between terms. The relationship should be strong. For example, if a Web page includes the term "Cleveland", the information might be "Ohio". As another example, if a Web page includes a telephone number with an area code in Chicago, the information might be "Chicago". As yet another example, the term "Michelangelo" and "Sistine Chapel" are strongly related. Thus, a Web page with the term "Sistine Chapel" might be associated with the term "Michelangelo" such that if a search query includes "Michelangelo", the Web page would received a higher search score than it would have otherwise. Thus, the information (e.g., Ohio, Chicago, Michelangelo, etc.) might not be sourced from a document or Web page having a particular relationship with the Web page with which it will be associated. Rather, the information might be determined based on a relationship with information on the Web page. The strength of the relationship of terms might be dependent on the direction of the relationship. For example, it might be useful to associate the term "virus" with a Web page pertaining to "computer security", but it might not be useful to assoicate the term "computer security" with a Web page pertaining to "viruses". Various information expansion techniques may be used to determine one or more terms related to a seed term.

§4.3 Examples of Operations of Exemplary Embodiments

§4.3.1 Example 1

Propagating Authoritative Information Down

Figure 8:
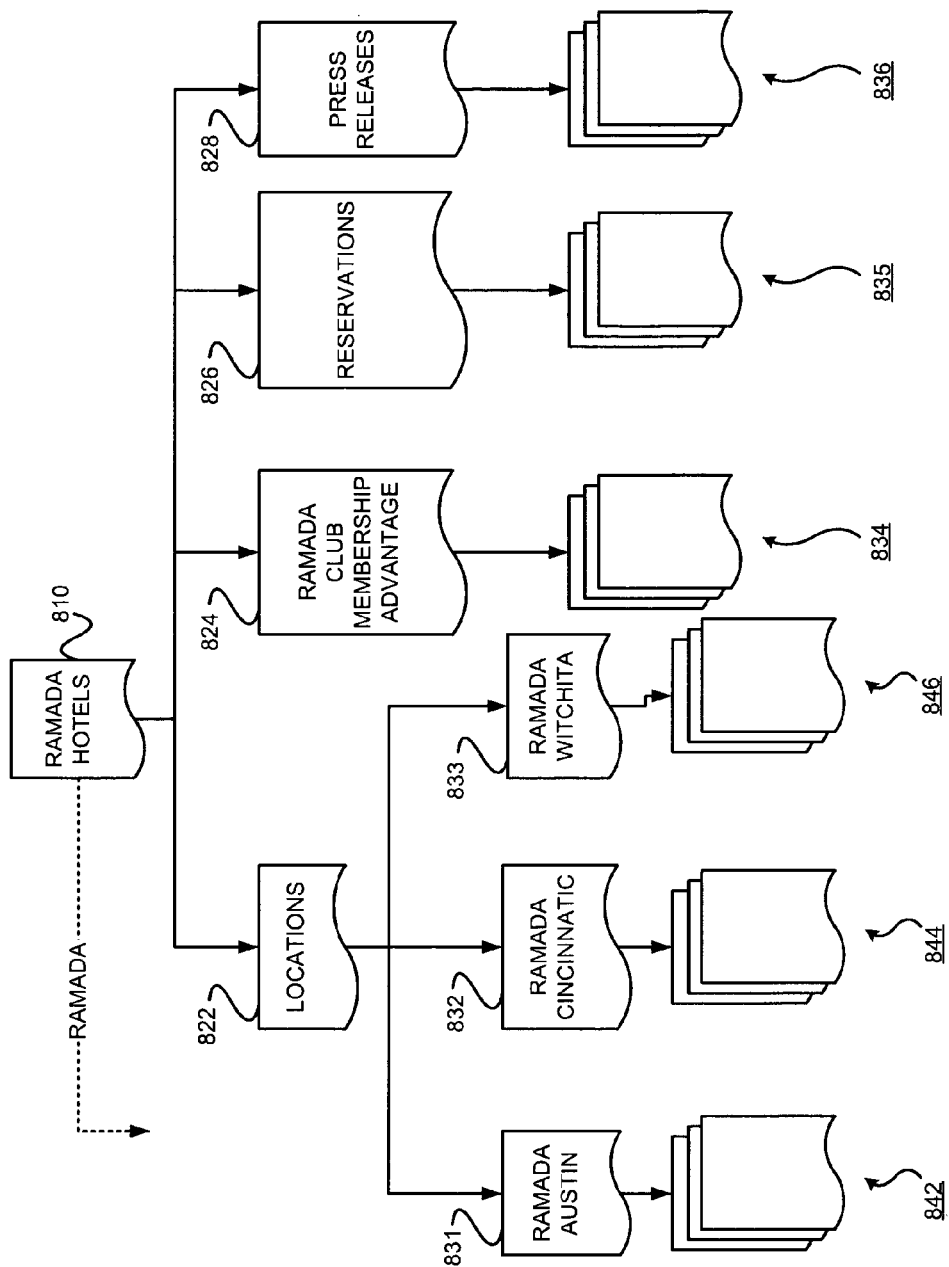
FIG. 8 illustrates an example of propagating intra-Website information down to Web pages of the Website.

FIG. 8 illustrates an example of propagating authoritative intra-Website information down to Web pages of the Website. (Recall, e.g., the exemplary method 600 of FIG. 6.) Assume that the home page 810 of Ramada's Website 800 is authoritative for the term "Ramada". For example, assume that the majority of links consisting of the text "Ramada" point to Web pages on the Ramada.com Website. (Recall block 620 of FIG. 6.) Additional checks may be used to validate the term in that query to verify that users do, in fact, usually want that Website when they use that term.

In this example, it is assumed that all other Web pages on the Website, except for Web pages including the Web page www.ramada.com/Ramada/control/press_releases_list 828 and below 836, are "related to" the home page. (Recall blocks 640 and 650 of FIG. 6.). That is, the identified information "Ramada" will not be associated with "press release" type Web pages 828, 836 of the Website 800.

The identified information - - - "Ramada" - - - may be associated with the non-exempted Web page 822 and its descendants 831, 832, 833, 842, 844, 846, Web page 824 and its descendants 834, and Web page 826 and its descendants 835 on Ramada's Website 800 related to the home page 810. Such an association may be made by annotating a copy of each non-excluded Web page in ramada.com (Recall, e.g., repository 214 of FIG. 2.), or information derived from such Web pages used for IR, as being topical for the term "ramada". These associations should be made such that the techniques used by a search engine will consider these Web pages more relevant for the term "ramada". For example, when processing a query, if the query contains the entire term, each annotated Web page, may be considered as having N (e.g., six) additional Web pages pointing to it, using the phrase as anchor text, thereby boosting a Page rank score of the page when Google search techniques are used.

§4.3.2 Example 2

Propagating Highly Descriptive Information Up

Figure 9:
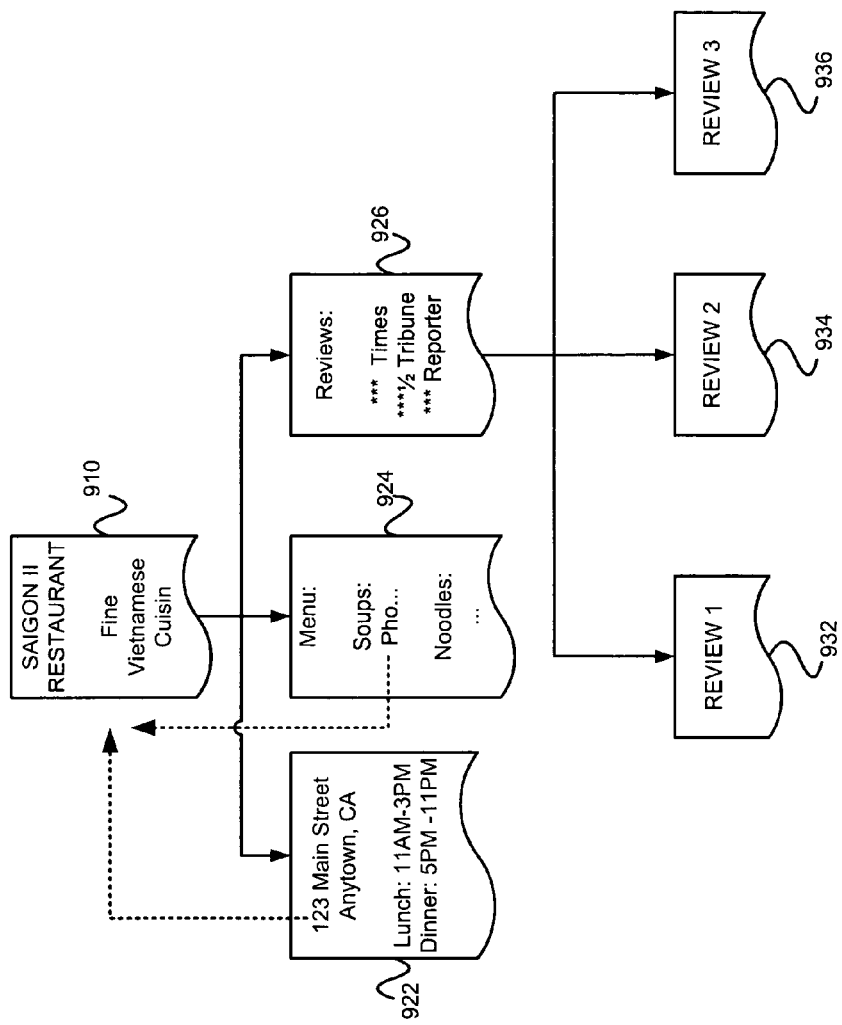
FIGS. 9 and 10 illustrate first and second examples of propagating intra-Website information up to a Web page of the Website.

FIG. 9 illustrates a first example of propagating highly descriptive intra-Website information up to a Web page 910 of the Website 900. The Website 900 is for the Vietnamese restaurant "Saigon II". Assume that the home (or root) Web page 910 of the Website 900 does not include the address of the restaurant, but that a lower Web page 922 of the Website 900 includes the address 123 Main Street, Anytown, Calif. The address may be identified (Recall 720 of FIG. 7.). Assume further that "123 Main Street, Anytown, Calif." may be deemed an address or location with the desired level of confidence (e.g., due to the terms "street", the state abbreviation "CA", the syntax of the address, etc.). The home page 910 for the Website 900 may be given credit for (e.g., treated as including) the location "123 Main Street, Anytown, Calif." (e.g., for purposes of search) even though the name of the location doesn't appear on that home page 910.

In addition, a Web page 924 of the Website 900 includes menu items of the restaurant. One of the menu items is "pho" (a beef noodle soup). Assume that "pho" is considered to be a highly descriptive term (e.g., due to it's infrequent use in a wide collection of Web pages). This term may be identified and propagated up to the home page 910 of the Website 900 as well. Thus, the home page 910 of the Website 900 may be given credit for (e.g., treated as including) the term "pho" (e.g., for purposes of search) even though this term doesn't appear on the home page 910.

Assume that a query from a client device located in (or near) Anytown, Calif. submits a query for "pho restaurants" and that the query information is supplemental with the client device location. The home page 910 matches restaurants. Further, since the home page 910 has been supplemented with the location from Web page 922 and the term "pho" from the Web page 924, it 910 also matches the term "pho" from the query and the recognized location Of the client device. Thus, the home page 910, as supplemented with the location and descriptive term "pho" is found to be much more relevant to this search than it would be otherwise.

§4.3.3 Example 3

Propagating Highly Descriptive Category Information Up

Figure 10:
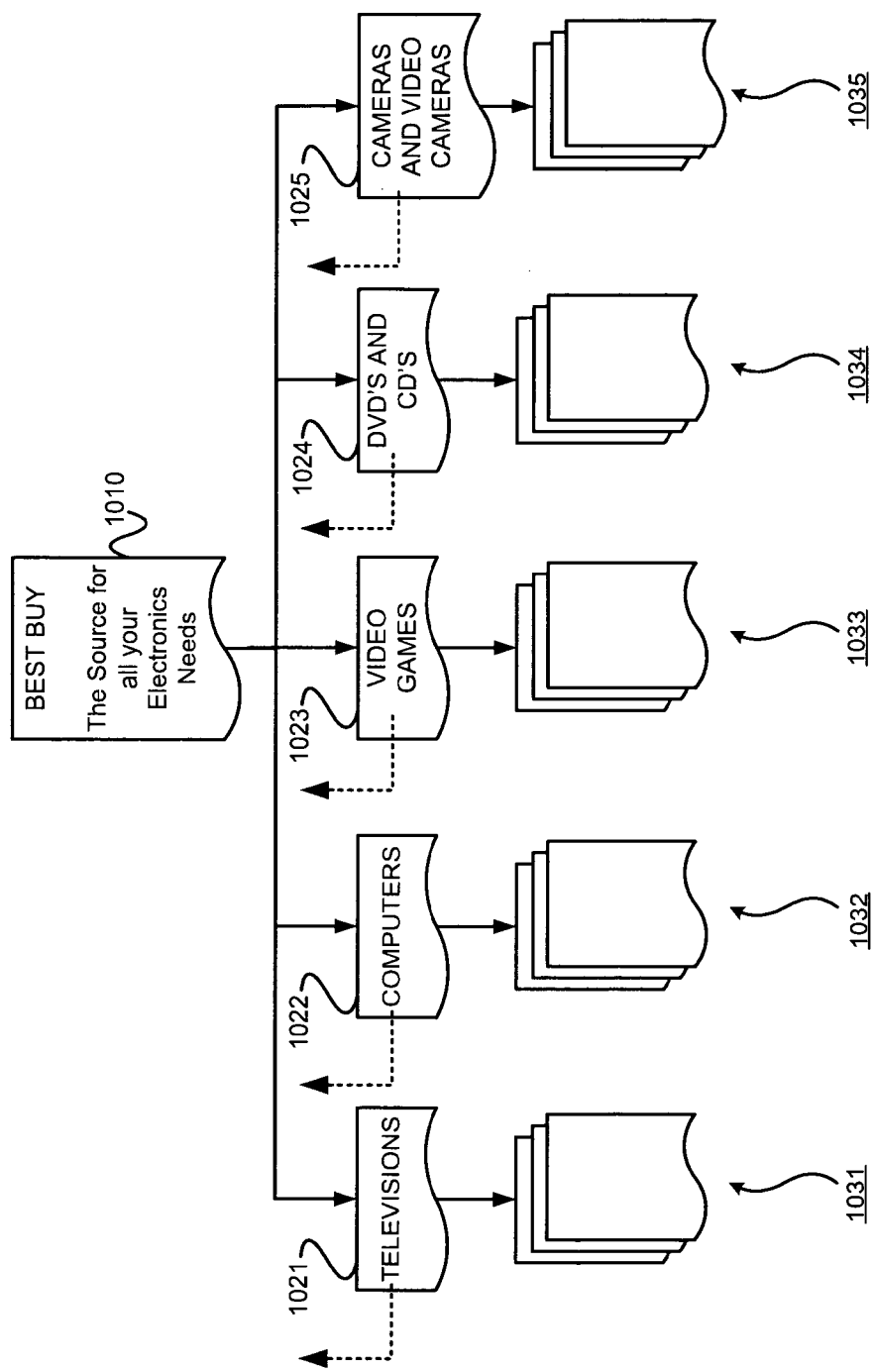

FIG. 10 illustrates a second example of propagating intra-Website information up to a Web page 1010 of the Website 1000. In this example, the Website 1000 is for the electronics retailer Best Buy. The home (or root) page 1010 includes links to various Web pages 1021-1025 corresponding to various product categories. These Web pages 1021-1025, in turn, include links to various Web pages 1031-1035 corresponding to particular products.

Assume that product categories are considered to be highly descriptive. In this example, such product categories may be identified in the Web pages 1021-1025 and propagated up to the home page 1010 of the Website 1000. Thus, the home page 1010 of the Website 1000 may be given credit for (e.g., treated as including) the terms "televisions", "computers", "video games", "DVDs", "CDs", "cameras" and "video cameras" (e.g., for purposes of search) even if these terms don't appear on the home page 1010. (Note that the term "best buy" might also be propagated down to the Web pages 1021-1025 and 1031-1035 of the Website 1000.)

Suppose a search for "televisions and video games" is received. In this example, the home page 1010 for Best Buy would be more relevant to such a query than it would have been otherwise.

§4.4 Conclusions

As can be appreciated from the foregoing, it would be useful to improve search engines so that they return better search results than automated search engines that use just the information directly about a Web page (e.g., the words on the Web page and their structure, the words in anchors pointing to the Web page, the Page-rank of the Web page, etc.).

The invention claimed is:
1. A computer-implemented method comprising:
selecting a candidate term from among one or more terms in a first web page of a web site, wherein the first web page is not a home or root web page of the web site;

determining that the candidate term is uncommon, wherein an uncommon term is a term that occurs with less than a threshold frequency in a collection of web pages; and in an index of web pages that identifies terms and, for each term, identifies one or more web pages that are associated with the term, updating an association of the candidate term with a home or root web page of the web site to generate an updated index of web pages, including updating a boost value associated with the association of the candidate term with the home or root web page in the index of web pages.

2. The method of claim 1, wherein the home or root web page is above the first web page in a URL hierarchy of the web site.

3. The method of claim 1, wherein the index of web pages has no association between the candidate term and the home or root web page of the web site, and wherein updating an association of the candidate term with the home or root web page of the web site comprises adding an association of the candidate term with the home or root web page of the web site to generate the updated index of web pages.

4. The method of claim 1, wherein updating the association of the candidate term with the home or root web page of the web site comprises increasing a weight of an association of the candidate term with the home or root web page of the web site in the index of web pages to generate the updated index of web pages.

5. The method of claim 1, wherein determining that the candidate term is uncommon comprises determining that the candidate term has an inverse document frequency with reference to the collection of web pages, the inverse document frequency being above a threshold.

6. A system comprising:
one or more processors;
at least one input device; and
one or more storage devices storing processor-executable instructions which, when executed by the one or more processors, cause the one or more processors to perform operations comprising:
selecting a candidate term from among one or more terms in a first web page of a web site, wherein the first web page is not a home or root web page of the web site;
determining that the candidate term is uncommon, wherein an uncommon term is a term that occurs with less than a threshold frequency in a collection of web pages; and
in an index of web pages that identifies terms and, for each term, identifies one or more web pages that are associated with the term, updating an association of the candidate term with a home or root web page of the web site to generate an updated index of web pages, including updating a boost value associated with the association of the candidate term with the home or root web page in the index of web pages.

7. The system of claim 6, wherein the home or root web page is above the first web page in a URL hierarchy of the web site.

8. The system of claim 6, wherein the index of web pages has no association between the candidate term and the home or root web page of the web site, and wherein updating an association of the candidate term with the home or root web page of the web site comprises adding an association of the candidate term with the home or root web page of the web site to generate the updated index of web pages.

9. The system of claim 6, wherein updating the association of the candidate term with the home or root web page of the web site comprises increasing a weight of an association of the candidate term with the home or root web page of the web site in the index of web pages to generate the updated index of web pages.

10. The system of claim 6, wherein determining that the candidate term is uncommon comprises determining that the candidate term has an inverse document frequency with reference to the collection of web pages, the inverse document frequency being above a threshold.

11. A computer-implemented method comprising:
selecting a candidate term from among one or more terms in a first web page of a web site, wherein the first web page is not a home or root web page of the web site;
determining that the candidate term is uncommon, wherein an uncommon term is a term that occurs with less than a threshold frequency in a collection of web pages;
identifying in the web site a second web page that is above the first web page in a hierarchy of the web site and that is within a predetermined distance from the first web page in the hierarchy; and
in an index of web pages that identifies terms and, for each term, identifies one or more web pages that are associated with the term, updating an association of the candidate term with the second web page of the web site to generate an updated index of web pages, including updating a boost value associated with the association of the candidate term with the second web page in the index of web pages to generate the updated index of web pages.

12. The method of claim 11, wherein the hierarchy of the web site is a web site topology.

13. The method of claim 11, wherein the hierarchy of the web site is a URL hierarchy.

14. The method of claim 11, wherein updating the index of web pages to update an association of the candidate term with the second web page of the web site comprises adding an association of the candidate term with the second web page of the web site to generate the updated index of web pages.

15. The method of claim 11, wherein updating the index of web pages to update an association of the candidate term with the second web page of the web site comprises increasing a weight of an association of the candidate term with the second web page of the web site in the index of web pages to generate the updated index of web pages.

16. The method of claim 11, wherein the predetermined distance comprises a number of links between the first web page and the second web page.

17. The method of claim 11, wherein the predetermined distance comprises a number of levels of a URL hierarchy.

18. A system comprising:
one or more processors;
at least one input device; and
one or more storage devices storing processor-executable instructions which, when executed by the one or more processors, cause the one or more processors to perform operations comprising:
selecting a candidate term from among one or more terms in a first web page of a web site, wherein the first web page is not a home or root web page of the web site;
determining that the candidate term is uncommon, wherein an uncommon term is a term that occurs with less than a threshold frequency in a collection of web pages;
identifying in the web site a second web page that is above the first web page in a hierarchy of the web site and that is within a predetermined distance from the first web page in the hierarchy; and in an index of web pages that identifies terms and, for each term, identifies one or more web pages that are associated with the term, updating an association of the candidate term with the second web page of the web site to generate an updated index of web pages, including updating a boost value associated with the association of the candidate term with the second web page in the index of web pages to generate the updated index of web pages.

19. The system of claim 18, wherein the hierarchy of the web site is a web site topology.

20. The system of claim 18, wherein the hierarchy of the web site is a URL hierarchy.

21. The system of claim 18, wherein updating the index of web pages to update an association of the candidate term with the second web page of the web site comprises adding an association of the candidate term with the second web page of the web site to generate the updated index of web pages.

22. The system of claim 18, wherein updating the index of web pages to update an association of the candidate term with the second web page of the web site comprises increasing a weight of an association of the candidate term with the second web page of the web site in the index of web pages to generate the updated index of web pages.

23. The system of claim 18, wherein the predetermined distance comprises a number of links between the first web page and the second web page.

24. The system of claim 18, wherein the predetermined distance comprises a number of levels of a URL hierarchy.

25. A computer-implemented method comprising:
selecting a candidate term from among one or more terms in a first web page of a web site, wherein the first web page is not a home or root web page of the web site;
determining that the candidate term is uncommon, wherein an uncommon term is a term that occurs with less than a threshold frequency in a collection of web pages; and
in an index of web pages that identifies terms and, for each term, identifies one or more web pages that are associated with the term, updating an association of the candidate term with a home or root web page of the web site to generate an updated index of web pages,
wherein the index of web pages has no association between the candidate term and the home or root web page of the web site, and wherein updating the association of the candidate term with the home or root web page of the web site comprises adding an association of the candidate term with the home or root web page of the web site to generate the updated index of web pages;
receiving a search query including the candidate term; and
determining that the home or root web page satisfies the query if the updated index is used to perform the search requested by the search query.

26. The method of claim 25, wherein the home or root web page is above the first web page in a URL hierarchy of the web site.

27. The method of claim 25, wherein updating the association of the candidate term with the home or root web page of the web site comprises updating a boost value associated with the association of the candidate term with the home or root web page in the index of web pages to generate the updated index of web pages.

28. The method of claim 25, wherein determining that the candidate term is uncommon comprises determining that the candidate term has an inverse document frequency with reference to the collection of web pages, the inverse document frequency being above a threshold.

29. A system comprising:
one or more processors;
at least one input device; and
one or more storage devices storing processor-executable instructions which, when executed by the one or more processors, cause the one or more processors to perform operations comprising:
selecting a candidate term from among one or more terms in a first web page of a web site, wherein the first web page is not a home or root web page of the web site;
determining that the candidate term is uncommon, wherein an uncommon term is a term that occurs with less than a threshold frequency in a collection of web pages; and
in an index of web pages that identifies terms and, for each term, identifies one or more web pages that are associated with the term, updating an association of the candidate term with a home or root web page of the web site to generate an updated index of web pages;
receiving a search query including the candidate term; and
determining that the home or root web page satisfies the query if the updated index is used to perform the search requested by the search query.

30. The system of claim 29, wherein the home or root web page is above the first web page in a URL hierarchy of the web site.

31. The system of claim 29, wherein updating the association of the candidate term with the home or root web page of the web site comprises updating a boost value associated with the association of the candidate term with the home or root web page in the index of web pages to generate the updated index of web pages.

32. The system of claim 29, wherein determining that the candidate term is uncommon comprises determining that the candidate term has an inverse document frequency with reference to the collection of web pages, the inverse document frequency being above a threshold.

33. A computer-implemented method comprising:
selecting a candidate term from among one or more terms in a first web page of a web site, wherein the first web page is not a home or root web page of the web site;
determining that the candidate term is uncommon, wherein an uncommon term is a term that occurs with less than a threshold frequency in a collection of web pages;
identifying in the web site a second web page that is above the first web page in a hierarchy of the web site and that is within a predetermined distance from the first web page in the hierarchy; and
in an index of web pages that identifies terms and, for each term, identifies one or more web pages that are associated with the term, updating an association of the candidate term with the second web page of the web site to generate an updated index of web pages,
wherein the index of web pages has no association between the candidate term and the second web page of the web site, and wherein updating the association of the candidate term with the second web page of the web site comprises adding an association of the candidate term with the second web page of the web site to generate the updated index of web pages;
receiving a search query including the candidate term; and determining that the second web page satisfies the query if the updated index is used to perform the search requested by the search query.

34. The method of claim 33, wherein the hierarchy of the web site is a web site topology.

35. The method of claim 33, wherein the hierarchy of the web site is a URL hierarchy.

36. The method of claim 33, wherein updating the index of web pages to update an association of the candidate term with the second web page of the web site comprises updating a boost value associated with the association of the candidate term with the second web page in the index of web pages to generate the updated index of web pages.

37. The method of claim 33, wherein the predetermined distance comprises a number of links between the first web page and the second web page.

38. The method of claim 33, wherein the predetermined distance comprises a number of levels of a URL hierarchy.

39. A system comprising:
one or more processors;
at least one input device; and
one or more storage devices storing processor-executable instructions which, when executed by the one or more processors, cause the one or more processors to perform operations comprising:
selecting a candidate term from among one or more terms in a first web page of a web site, wherein the first web page is not a home or root web page of the web site;
determining that the candidate term is uncommon, wherein an uncommon term is a term that occurs with less than a threshold frequency in a collection of web pages;
identifying in the web site a second web page that is above the first web page in a hierarchy of the web site and that is within a predetermined distance from the first web page in the hierarchy; and
in an index of web pages that identifies terms and, for each term, identifies one or more web pages that are associated with the term, updating an association of the candidate term with the second web page of the web site to generate an updated index of web pages,
wherein the index of web pages has no association between the candidate term and the second web page of the web site, and wherein updating the association of the candidate term with the second web page of the web site comprises adding an association of the candidate term with the second web page of the web site to generate the updated index of web pages;
receiving a search query including the candidate term; and
determining that the second web page satisfies the query if the updated index is used to perform the search requested by the search query.

40. The system of claim 39, wherein the hierarchy of the web site is a web site topology.

41. The system of claim 39, wherein the hierarchy of the web site is a URL hierarchy.

42. The system of claim 39, wherein updating the index of web pages to update an association of the candidate term with the second web page of the web site comprises updating a boost value associated with the association of the candidate term with the second web page in the index of web pages to generate the updated index of web pages.

43. The system of claim 39, wherein the predetermined distance comprises a number of links between the first web page and the second web page.

44. The system of claim 39, wherein the predetermined distance comprises a number of levels of a URL hierarchy.

* * * * *